United States Patent [19]

Yamagishi et al.

[11] Patent Number: 4,912,484

[45] Date of Patent: Mar. 27, 1990

[54] METHOD OF CONTROLLING THERMAL HEAD

[75] Inventors: Masahiko Yamagishi; Yasuaki Nakazaki, both of Nagano, Japan

[73] Assignees: Fuji Photo Film Co., Ltd., Kanagawa; Nagano Nihon Musen Kabushiki Kaisha, Nagano, both of Japan

[21] Appl. No.: 241,449

[22] Filed: Sep. 8, 1988

[30] Foreign Application Priority Data

Sep. 8, 1987 [JP] Japan ................................ 62-223049
Sep. 8, 1987 [JP] Japan ................................ 62-223050

[51] Int. Cl.$^4$ ................................................ G01D 9/00

[52] U.S. Cl. ................................ 346/1.1; 346/76 PH; 400/120

[58] Field of Search ........................... 346/76 PH, 1.1; 400/120 PH

[56] References Cited

U.S. PATENT DOCUMENTS 4,595,936 6/1986 Nakajima et al. ................... 400/120

*Primary Examiner*—Bruce A. Reynolds

*Assistant Examiner*—Huan Tran

*Attorney, Agent, or Firm*—Sughrue, Mion, Zinn, Macpeak & Seas

[57] ABSTRACT

A method of controlling the scanning of the thermal head to insure uniform printing density. The method comprises scanning thermal sensitive paper with the thermal head in a first direction while supplying the printing signal to the thermal head to thereby effect desired printing, terminating the printing signal after the completion of the printing while continuing the scanning of the paper in the first direction until heat accumulated in the thermal head has dissipated, and thereafter returning the thermal head while in contact with the thermal sensitive paper in a second direction opposite to the first direction. In the alternative, the thermal head can be disengaged from the thermal sensitive paper after the completion of printing a single line until heat accumulated in the thermal head has dissipated, and subsequently returning the thermal head while in contact with the thermal sensitive paper in the second direction. In this manner, the printing density can be maintained at a uniform level.

5 Claims, 3 Drawing Sheets

METHOD OF CONTROLLING THERMAL HEAD

BACKGROUND OF THE INVENTION

1. Field Of The Invention

The present invention relates to a method of controlling the scanning of a thermal head of an image recording apparatus.

2. Background

Among image recording apparatuses designed to record an image on paper wound in the form of a roll or cut in the form of a sheet, there is one type of apparatus in which the entire paper surface having a predetermined size is not recorded simultaneously, but rather the paper is scanned with a recording device over an area corresponding to the main scanning width of the recording device repeatedly until the required recording is complete. For example, an image recording apparatus that employs thermalsensitive paper is arranged such that a thermal head having a predetermined main scanning width is moved in the sub scanning direction in contact with the thermalsensitive paper to thereby effect printing of one line. After each line has been recorded, the thermalsensitive paper is fed one line in the main scanning direction, which procedure is repeated to effect recording on a predetermined sized paper.

Printing by means of a thermal head is effected in such a manner that the thermal head is supplied with a printing signal and moved in the sub scanning direction (in a first direction). After the completion of printing a single line, the printing signal is terminated with the thermal head remaining in contact with the paper. Thereafter, the thermal head is moved in a second direction opposite to the first direction so as to return to the print start position. Accordingly, the thermal head stops once on the thermalsensitive paper when the head, having moved in the first direction to print the thermalsensitive paper, is reversed so as to move in the second direction.

When the printing signal is terminated, the generation of heat in the thermal head is suspended, but the thermal head itself has heat absorbing properties. Therefore, when the thermal head stops on the thermalsensitive paper as described above, the paper is heated twice at the head stop position by both the heat generated in response to the printing signal and by heat retained in the head. Accordingly, the image corresponding to the thermal head stop position becomes darker than the other images, resulting in nonuniform printing density.

To eliminate the nonuniform density, one possibility is to prevent the contact between the thermal head and the thermalsensitive paper after the completion of printing by the head. However, this solution requires a thermal head release mechanism comprising, for example, a plunger, solenoid, cam, etc., which complicates the structure of the recording apparatus and increases the overall size of the apparatus.

SUMMARY OF THE INVENTION

In view of the above-described problems of the prior art, it is a primary object of the present invention to provide a thermal head controlling method and apparatus which enables printing of uniform density to be effected with a simple arrangement.

To this end, according to a first embodiment of the present invention, there is provided a thermal head controlling method comprising the steps of: scanning thermalsensitive paper with a thermal head in a first direction while supplying a printing signal to the thermal head to thereby effect desired printing; terminating the printing signal after the completion of the printing but continuing the scanning in said first direction; and moving the thermal head on the thermalsensitive paper in a second direction, opposite to the first direction, after the heat accumulated in the thermal head has dissipated.

According to a second embodiment of the present invention, there is provided a thermal head controlling method comprising the steps of: scanning thermalsensitive paper with a thermal head in a first direction while supplying a printing signal to the thermal head to thereby effect desired printing; and allowing the thermal head and the thermalsensitive paper to come out of contact with each other after the completion of the printing.

DETAILED DESCRIPTION OF THE INVENTION

Embodiments of the present invention will be described hereinunder with reference to the accompanying drawings.

Figure 1:
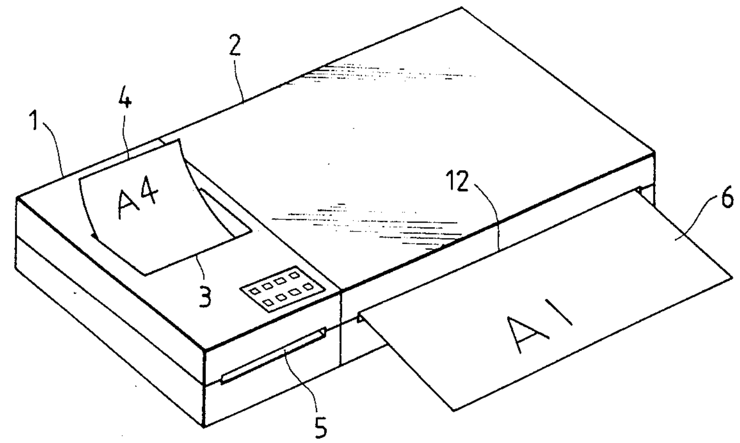
FIG. 1 is a perspective view of an enlarging copying machine to which the present invention is applied.

FIG. 1 is a perspective view of an enlarging copying machine to which the present invention is applied. The enlarging copying machine is designed to make a copy 594×841 mm in size from an original of 210×297 mm in size by way of example and the machine comprises an original reader 1 and a recorder 2.

The reader 1 has an image sensor which scans an original in the widthwise direction to thereby read the image of the original. When an original 4 is fed into the reader 1 from an original insertion opening 3, the original 4 is transported in such a manner as to be scanned with the image sensor and then discharged from an original discharge opening 5.

The recorder 2 accommodates thermalsensitive paper 6 of 594 mm in width which is wound in the form of a roll. The recorder has three thermal heads arranged to scan the thermalsensitive paper 6 in the widthwise direction. The three thermal heads have 64 dots within the effective main scanning width and are disposed at equal spacings on the same sub scanning line. The thermal heads simultaneously scan the thermalsensitive paper 6 through equal distances to effect printing for one line in the sub scanning direction. The thermalsensitive paper 6 which has been subjected to predetermined recording is discharged from a discharge opening 12.

Figure 2:
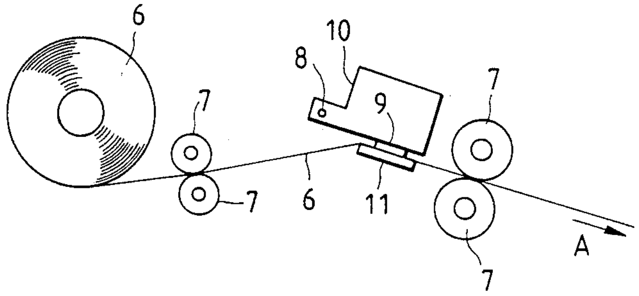
FIG. 2 schematically shows the arrangement of a recorder constituting the copying machine shown in FIG. 1.

FIG. 2 schematically shows the recorder 2 to which the present invention is applied. Thermalsensitive paper 6 wound in the form of a roll is loaded in such a manner that the paper 6 is held between two pairs of feed rollers 7 formed from silicone rubber, polyacetal, or the like. A predetermined level of tension is applied to the portion of the paper 6 which extends between the two pairs of feed rollers 7. A thermal head 9 is rigidly secured to a base 10 and is brought into contact with the thermalsensitive paper 6 supported on a platen 11 to scan the paper 6, thereby effecting printing. According to a first embodiment of the present invention, when one printing scan over the entire width of the thermalsensitive paper 6 is completed, the supply of the printing signal to the thermal head 9 is terminated, while the thermal head 9 continues moving together with the base 10 to scan the paper 6.

Figure 3:
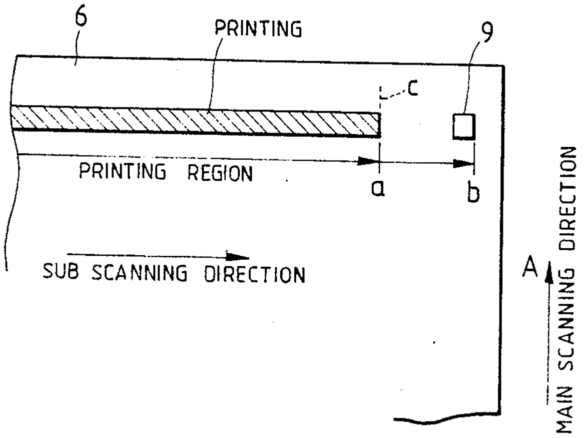
FIG. 3 shows a printing operation according to a thermal head controlling method of a first embodiment of the present invention.

More specifically, after the completion of printing the hatched area shown in FIG. 3, the printing signal to the thermal head 9 is terminated. That is, the printing signal is terminated when the thermal head is at position a. However, the thermal head 9 continues moving together with the base 10 in contact with the thermalsensitive paper 6 as far as point b, shown in FIG. 3.

The distance from point a to point b is determined on the basis of the amount of heat retained in the thermal head 9. That is, the distance is set so that substantially all the accumulated heat has already been dissipated when the thermal head 9 reaches point b.

As a result, of the above-described control, the end portion of the printing region is printed under the same conditions as those for the other portions of the printing region. Accordingly, there is no fear of over-development due to double heating and therefore printing density is uniform. Since the thermal head 9 continues scanning from point a to point b, there is no risk of the thermalsensitive paper 6 being undesirably developed by the heat retained in the thermal head 9.

After the thermal head 9 has reached point b, the head 9 is returned, that is, moved in the direction opposite to the sub scanning direction shown in FIG. 3, while being in contact with the thermalsensitive paper 6. When the thermal head 9 returns to the print start position, the printing for one line is completed.

It should be noted that the reciprocating motion of the thermal head 9 is performed along a guide shaft 8 shown in FIG. 2. When the thermal head 9, together with the base 10, is moved along the guide shaft 8 toward the obverse surface of the sheet illustrating FIG. 2, printing is effected, whereas, when the thermal head 9 is moved in the opposite direction, it is returning.

When the thermal head 9 returns to the print start position, the thermalsensitive paper 6 is fed in the main scanning direction, that is, in the direction of the arrow B, while in contact with the thermal head 9. It should be noted that, after the supply of the printing signal has been terminated, the first thermal head scans across the surface of that portion of the paper 6 which has been printed by the second thermal head, but there is no fear of double heating.

In the case where a plurality of thermal heads are installed, the size of the base increases. Therefore with the conventional device a plunger, solenoid, etc. which provide a relatively large driving force are needed to allow the thermal head and the thermalsensitive paper to disengage from each other upon completion of printing. However, application of the present invention eliminates the need for such complicated and costly control parts.

In the first embodiment of the present invention, after the completion of a single printing over the entire width of the thermalsensitive paper 6, the thermal head 9, together with the base 10 continues scanning to dissipate the heat accumulated in the thermal head 9. In a second embodiment of the present invention, when a single line has been printed over the entire width of the thermalsensitive paper 6, the base 10 pivots counterclockwise about the guide shaft 8 as shown by the arrow A, such that the thermal head 9 comes out of contact with the thermalsensitive paper 6.

Figure 4:
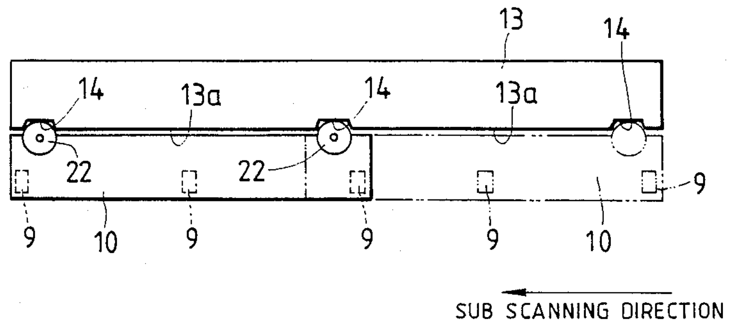
FIGS. 4 and 5 are plan views of a guide member, which show the reciprocating motion of the base according to a thermal head controlling method of a second embodiment of the present invention.
Figure 5:
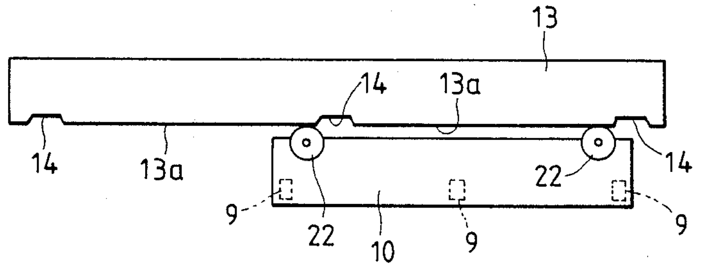
Figure 6:
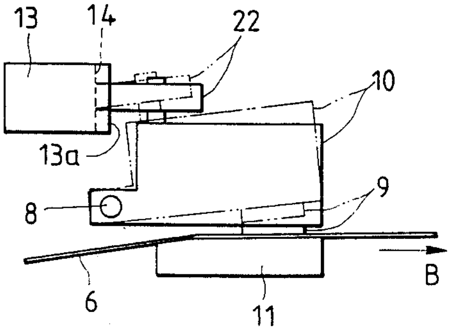
FIG. 6 is a side view showing the pivotal motion of the base and the thermal head.

FIGS. 4 to 6 illustrate a guide mechanism for effecting the above-described control.

More specifically, three thermal heads 9 are installed on the lower surface of the base 10 at predetermined spacings. The base 10 is arranged to reciprocate sideward as viewed in FIGS. 4 and 5 along the guide shaft 8. Two rollers 22 are rotatably provided on the upper surface of the base 10.

At the home position, the base 10 is positioned as shown by the detail line in FIG. 4, and the two rollers 22 are fitted in respective notches 14 formed in a guide member 13. At this time, the base 10 is in a counterclockwise pivoted position about the guide shaft 8, and the thermal heads 9 are not in contact with the thermalsensitive paper 6, as shown by the dotted line in FIG. 6. It should be noted that the above-described pivoting of the base 10 may be effected by a simple arrangement, i.e., by making use of pulling force from a spring (not shown) or the like.

When printing is to begin, the base 10 is moved in the sub scanning direction (illustrated in FIG. 4), and the thermal heads 9 are supplied with a printing signal. The rollers 22 come out of the respective notches 14 and roll along the side surface 13*a* of the guide member 13, as shown in FIG. 5. As a result the base 10 is forced to move by an amount corresponding to the depth of the notches 14 so as to pivot clockwise about the guide shaft 8, as shown by the solid line in FIG. 6.

Thus, the thermal heads 9 come into contact with the thermalsensitive paper 6 and scans to effect printing of a single line.

Upon completion of printing the single line, the printing signal to the thermal heads 9 is terminated, and the two rollers 22 are fitted into respective notches 14, as shown by the solid line in FIG. 4. Accordingly, the base 10, together with the thermal heads 9, pivots again as shown by the imaginary line in FIG. 6 thus allowing the thermal heads 9 to come out of contact with the thermalsensitive paper 6. At this time, the thermal heads 9 are still generating heat accumulated therein, but since the heads 9 are not in contact with the thermalsensitive paper 6, the paper 6 is not further developed by the accumulated heat. More specifically, the end printing portion is not heated twice and hence the end portion of the paper is not overdeveloped, at a particularly high density. Thus, nonuniformity of density is reduced.

After the heat accumulated in the thermal heads 9 has dissipated, the base 10 is moved in the direction opposite to the sub scanning direction, causing the two rollers 22 to come out of the respective fitting portions 14. Thus, the base 10 returns to the print start position. After all the necessary recording has been completed, the two rollers 22 are fitted into the respective notches 14 to position the base 10 in its home position. Although the thermal heads 9 are in contact with the thermalsensitive paper 6 during the return stroke, since no printing signal is supplied during the return stroke, the thermalsensitive paper 6 is not developed. As has been described above, it is possible to control the thermal heads so that the nonuniform density is reduced by providing a considerably simple guide mechanism.

Figure 7:
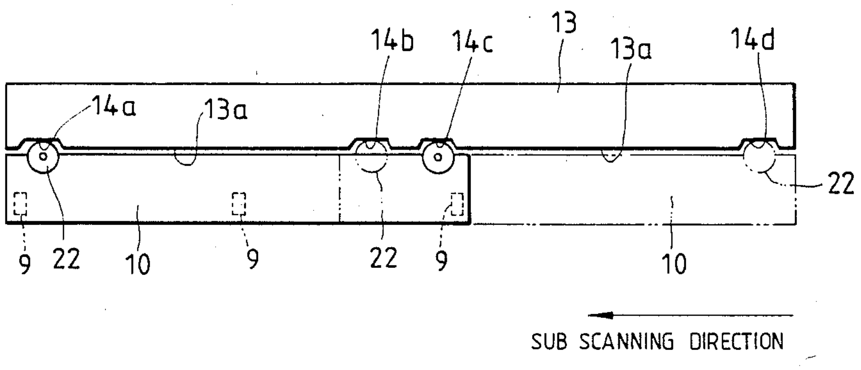
FIGS. 7 and 8 are plan views of the guide member, which show a modification of the second embodiment.
Figure 8:
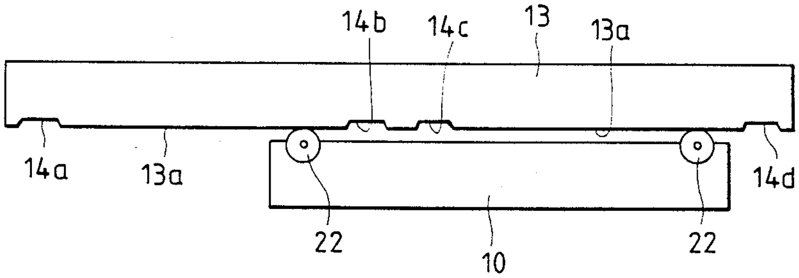

A modification of the thermal head controlling method according to the second embodiment will next be explained with reference to FIGS. 7 and 8. As illustrated, the guide member 13 is provided with four notches **14*a*, 14*b*, 14*c* and 14*d*. Among these notches, notches 14*b* and 14*d* enable the thermal heads 9 to come out of contact with the thermalsensitive paper 6 when the base 10 is set in its home position. When the base 10 is moved in the sub scanning direction, the two rollers 22 disengage from the respective notches 14*b* and 14*d* and roll along the side surface 13*a*. As a result, the base 10, together with the thermal heads 9, pivot in the manner described with reference to FIG. 6, thus allowing the heads 9** to perform printing.

When the rollers 22 are fitted into the respective notches **14*a* and 14*c* upon the completion of printing of a single line, the base 10, together with the thermal heads 9, pivot as described above, thus causing the thermal heads 9 to come out of contact with the thermalsensitive paper 6. Accordingly, using this modification it is possible to reduce the nonuniformity of density at the end of the printing and enable the thermal heads 9 to return to the home position while in contact with the thermalsensitive paper 6 after the heat accumulated in the heads 9** has been dissipated.

The above-described thermal head controlling method not only eliminates the nonuniformity of density but also provides the following advantages. Namely, the thermal heads 9 can be brought into contact with the thermalsensitive paper 6 without any impact by adjusting the angle of inclination of the slant surfaces defined between the notches 14 and the side surface **13*a*. In the case where a plurality of thermal heads 9 are employed as in the above-described embodiment, the size of the base 10 is inevitably increased; therefore, if the thermal heads 9 are controlled so as to come into and out of contact with the thermalsensitive paper 6** by the use of a plunger, solenoid, etc. as in the conventional device, it is difficult to reduce the impact force.

According to this embodiment, however, it is possible to reduce the nonuniformity of printing density due to the heat accumulated in the thermal heads 9 and the nonuniform density resulting from the impact force using the considerably simple structure described above.

As has been detailed above, according to the present invention, after printing has been effected by moving a thermal head in a first direction, the printing signal to the thermal head is terminated and, in this state, the thermal head continues to move in the first direction, and after the heat accumulated in the thermal head has dissipated, the head is returned while in contact on the thermalsensitive paper. Therefore, there is no fear of the thermalsensitive paper being heated twice by the heat accumulated in the thermal head, and it is possible to effect printing free from nonuniform density. Even if the thermal head does not continue to move in the first direction after the printing signal has been terminated, uniform printing density can be performed simply by allowing the thermal head and the thermalsensitive paper to come out of contact with each other to thereby prevent development of the thermalsensitive paper by the heat accumulated in the thermal head.

What is claimed is:

1. A method of controlling the scanning of a thermal head comprising the following steps:

scanning thermalsensitive paper with a thermal head in a first direction while supplying a printing signal to said thermal head to thereby effect desired printing of a line;

terminating the printing signal after the completion of the printing of said line and continuing the scanning of said line in said first direction until heat accumulated in said thermal head has dissipated; and thereafter returning said thermal head while in contact with said thermalsensitive paper in a second direction opposite to said first direction.

2. A method of controlling the scanning of a thermal head so as to prevent nonuniform printing density at an end of each printed line, comprising the steps of:

scanning thermalsensitive paper with a thermal head secured to a base in a first direction while supplying a printing signal to said thermal head to thereby effect desired printing of a line;

disengaging said thermal head from said thermalsensitive paper by pivotably moving said base after the completion of printing said line until heat accumulated in said thermal head has dissipated, and thereafter reengaging said thermal head on said thermalsensitive paper by pivotably moving said base; and returning said thermal head while in contact with said thermalsensitive paper in a second direction opposite to said first direction.

3. An image recording apparatus for recording an image on paper, said apparatus being designed such that the thermal head contacts said paper when printing each line and when returning in preparation to print a next line and said head does not contacted the paper after each line has been printed to allow the heat stored therein to dissipate prior to returning said head to print a subsequent line, said apparatus comprising:

a guide shaft;

a guide member extending in the direction of printing a single line, said guide member having a guiding portion comprising a linear guide surface and a plurality of slotted guide surfaces disposed in series on an outer surface thereof;

a base mounted to be moved along said guide shaft in said printing direction and pivotable about said guide shaft;

a thermal head fixedly secured to said base to effect printing on said paper; and a pair of rollers rotatably provided on said base, said base being spring biased such that said rollers contact said guiding portion of said guide member wherein when said rollers contact said linear guide surface of said guide member said head contacts said paper and when said rollers contact said slotted guide surface said base pivots such that said head no longer contacts said paper.

4. The image recording apparatus of claim 3, wherein the slope of the guiding portion between said linear guide surface and said slotted guide surface determines the impact at which said head contacts said paper.

5. An apparatus for controlling the scanning of a thermal head, comprising:

means for scanning thermal sensitive paper with a thermal head in a first direction while supplying a printed signal to said thermal head to thereby effect desired printing of a line;

means for terminating the printing signal after the completion of the printing of said line and continuing the scanning of said line in said first direction until heat accumulated in said thermal head has dissipated; and means for returning said thermal head while in contact with said thermal sensitive paper and a second direction opposite to said first direction.

* * * * *